United States Patent
Akiwa

(10) Patent No.: US 6,700,240 B2
(45) Date of Patent: Mar. 2, 2004

(54) STEPPING MOTOR, STEPPING MOTOR DEVICE AND DRIVING METHOD THEREOF

(75) Inventor: Naotaka Akiwa, Kitasaku-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 26 days.

(21) Appl. No.: 10/014,522

(22) Filed: Dec. 14, 2001

(65) Prior Publication Data

US 2002/0079769 A1 Jun. 27, 2002

(30) Foreign Application Priority Data

Dec. 27, 2000 (JP) ........................................ 2000-398523

(51) Int. Cl.⁷ ........................ H02K 21/00; H02K 29/00
(52) U.S. Cl. .............. 310/67 R; 310/49 R; 310/156.06; 310/254; 310/261
(58) Field of Search ............................. 310/49 R, 67 R, 310/68 B, 68 R, 90, 91, 254, 261, 156.06, 156.07

(56) References Cited

U.S. PATENT DOCUMENTS

| | | | | |
|---|---|---|---|---|
| 4,430,603 A | * | 2/1984 | Muller | ........................ 318/254 |
| 4,516,064 A | | 5/1985 | Oudet et al. | |
| 4,907,897 A | | 3/1990 | Shirotori | |
| 5,030,864 A | * | 7/1991 | Van Hout et al. | ......... 310/67 R |
| 5,386,161 A | | 1/1995 | Sakamoto | |
| 5,410,201 A | | 4/1995 | Tanaka et al. | |
| 5,654,600 A | * | 8/1997 | Nomura et al. | ........... 310/68 B |
| 5,744,894 A | * | 4/1998 | Cho et al. | .................... 310/261 |
| 5,864,192 A | | 1/1999 | Nagate et al. | |
| 5,990,651 A | | 11/1999 | Iwazawa et al. | |
| 6,164,833 A | | 12/2000 | Kai et al. | |
| 6,316,856 B1 | * | 11/2001 | Kusaki et al. | ................. 310/90 |

FOREIGN PATENT DOCUMENTS

| | | | | |
|---|---|---|---|---|
| JP | 354099910 | * | 8/1979 | .................. 310/254 |
| JP | 56029449 | | 3/1981 | |
| JP | 363077363 | * | 4/1988 | ............... 310/49 R |
| JP | A 5-221388 | | 8/1993 | ............... 310/49 R |
| JP | A 9-325197 | | 12/1997 | ............... 310/49 R |

* cited by examiner

*Primary Examiner*—Tran Nguyen
(74) *Attorney, Agent, or Firm*—Oliff & Berridge, PLC

(57) ABSTRACT

A stepping motor comprises a permanent magnet type rotor with a plurality of poles secured to a rotating shaft and a stator having stator magnetic poles with stator magnetic pole teeth in which excitation windings are wound on a plurality of magnetic poles in a star or delta connection, wherein the rotor is magnetized in different directions alternately circumferentially to satisfy the following equation: $M=4F/3$ where M is the number of poles of the rotor and F is the number of the stator magnetic poles, the rotor is cylindrical in shape with the stator rotatably disposed inside, disposed opposing the surfaces of the stator magnetic pole teeth through an air gap which is of a uniform dimension throughout the circumference between the surfaces of the stator magnetic pole teeth of the stator and the rotor, and the surface magnetic flux distribution thereof has a substantially sinusoidal wave form circumferentially. The stepping motor realizes smooth rotation and simplification in the structure of the rotor. In addition, the present invention provides a stepping motor device using the above-mentioned stepping motor and a method of driving the device.

19 Claims, 9 Drawing Sheets

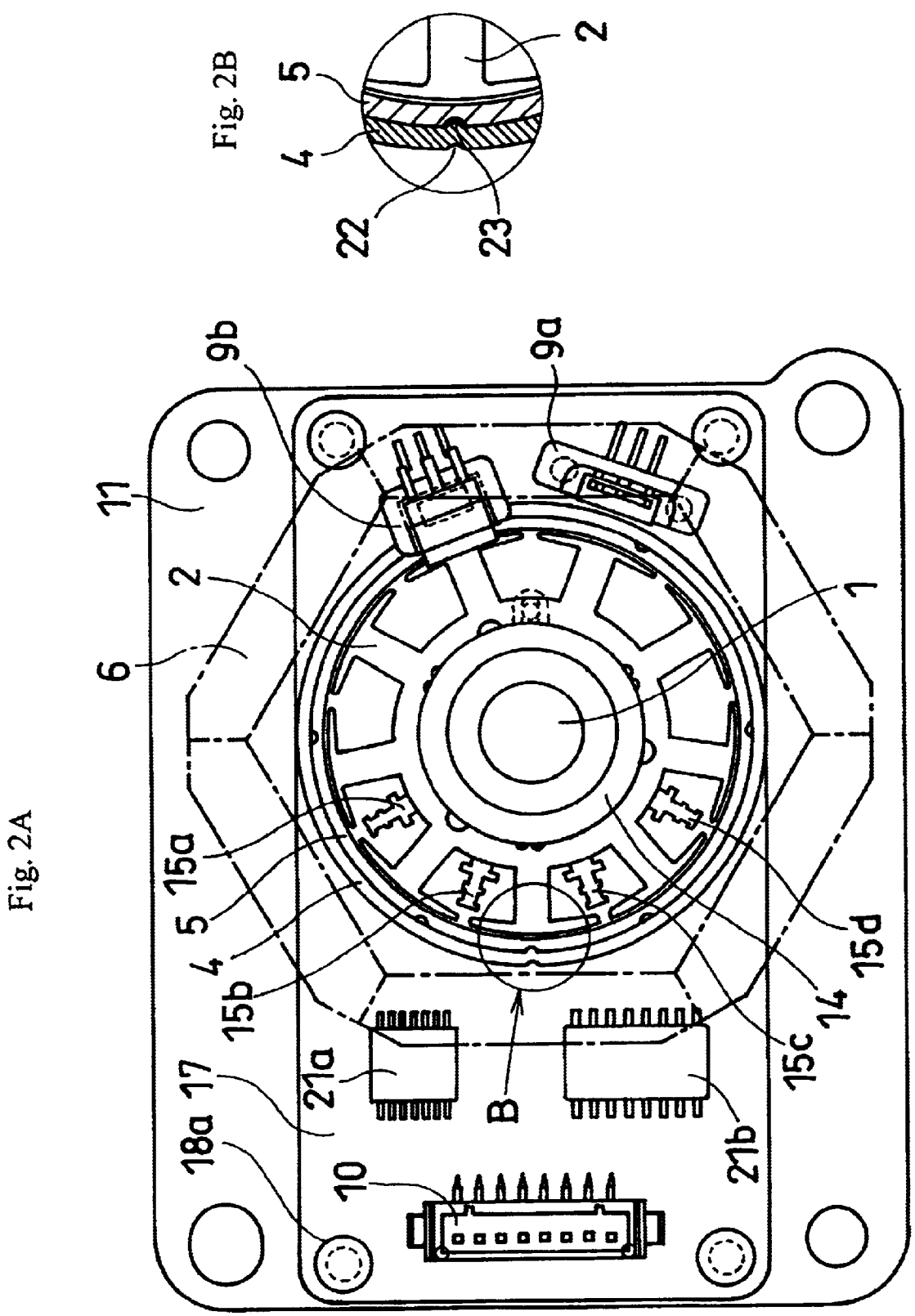

Fig. 7A
| STEP NO. | 1 | 2 | 3 | 4 | 5 | 6 |
|---|---|---|---|---|---|---|
| EXCITED MAGNETIC PHASE U | + | + | GND | GND | GND | + |
| EXCITED MAGNETIC PHASE V | GND | + | + | + | GND | GND |
| EXCITED MAGNETIC PHASE W | GND | GND | GND | + | + | + |
Fig. 7B
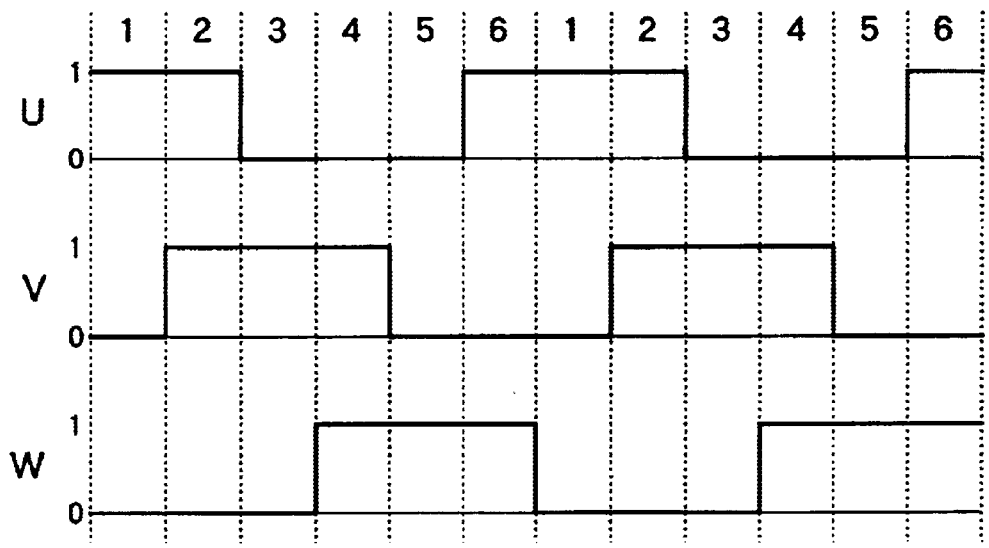
Fig. 7C
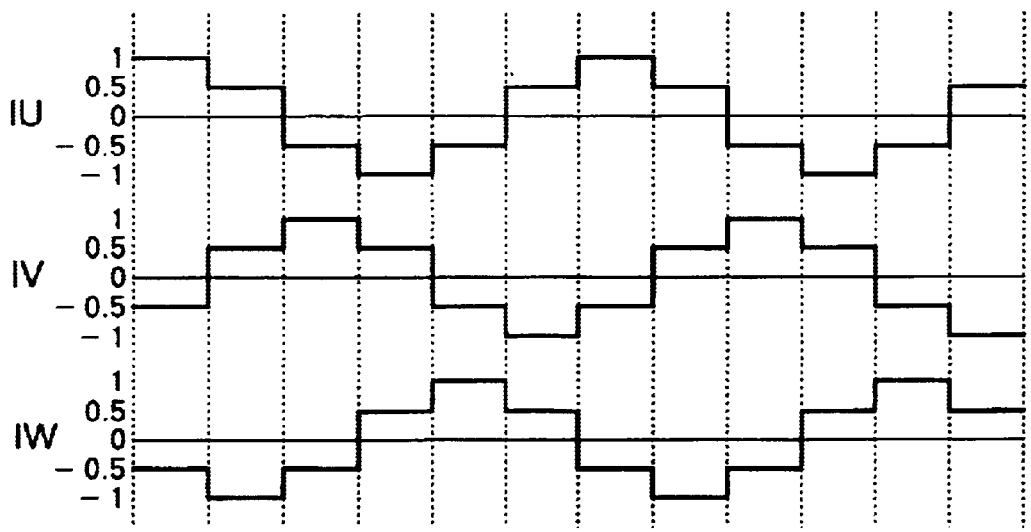

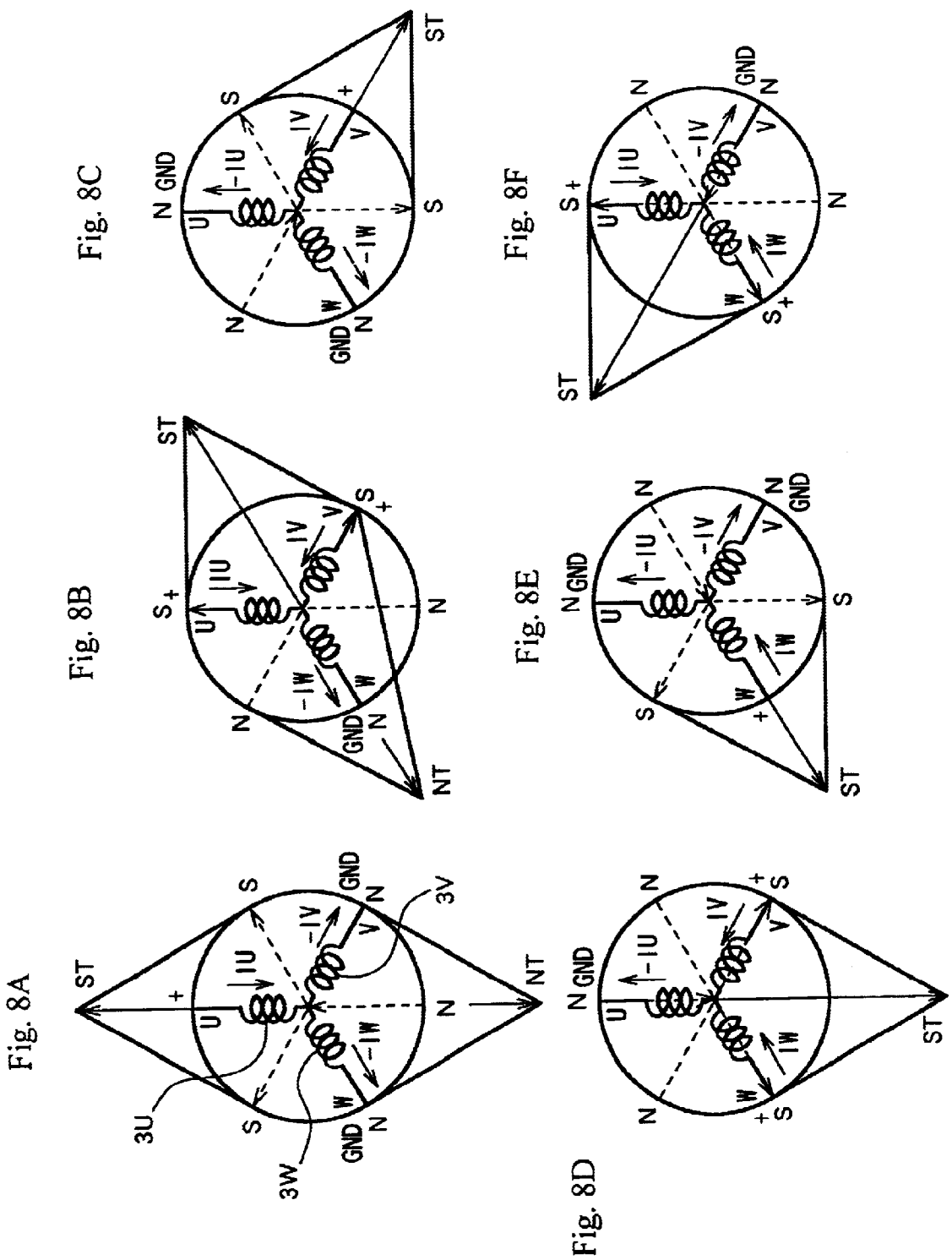

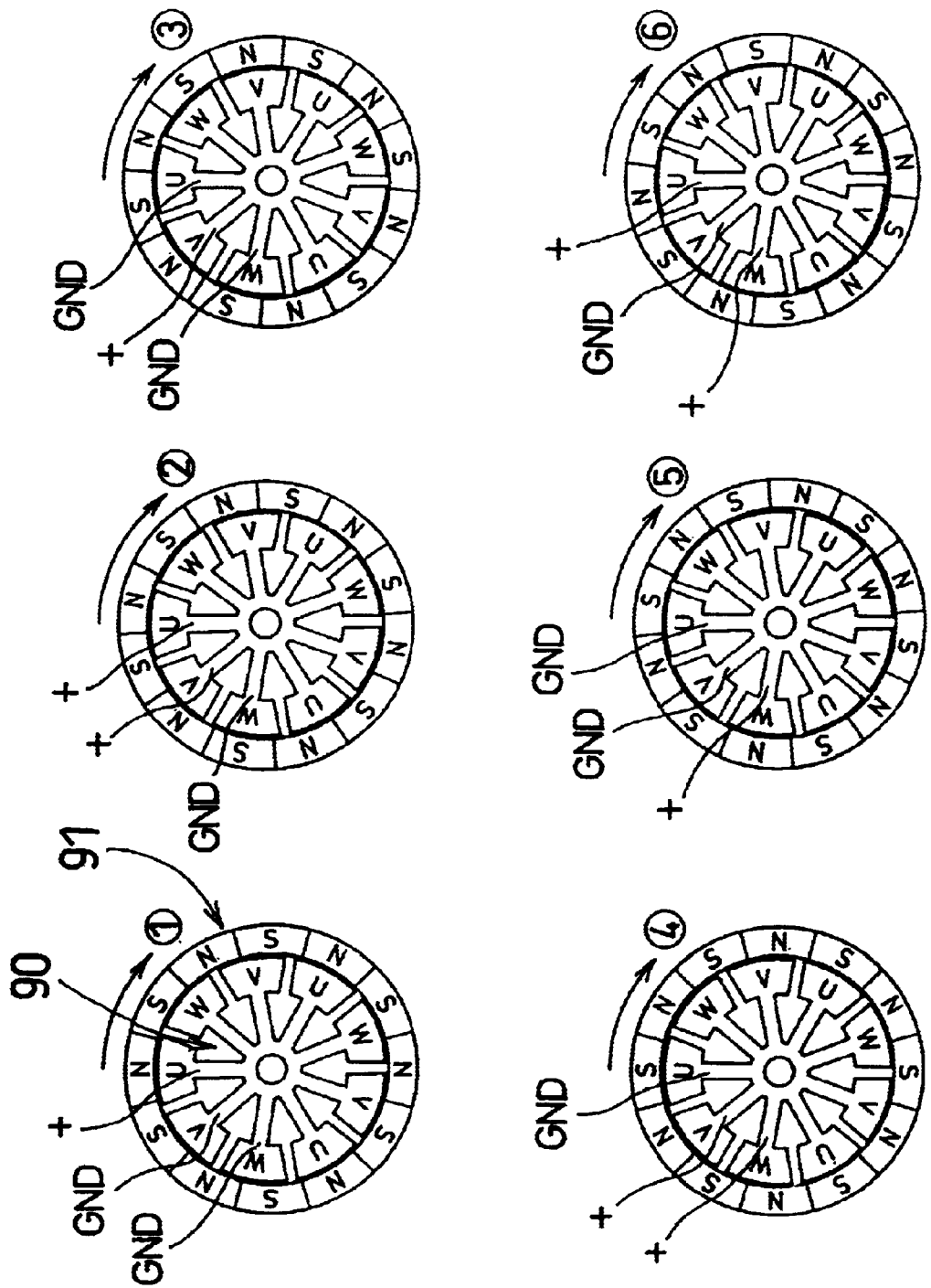

STEPPING MOTOR, STEPPING MOTOR DEVICE AND DRIVING METHOD THEREOF

BACKGROUND OF THE INVENTION

1. Field of the Invention

The present invention relates to a stepping motor structure, a stepping motor device and a driving method thereof to rotate a rotary polygon mirror for measuring the inter-vehicle distance, direction and relative speed of a preceding vehicle.

2. Description of Related Art

Conventionally, a stepping motor using a permanent magnet for a rotor has been often used for driving a rotary portion of an office machine such as a printer, high-speed facsimile equipment, a copying machine for PPC (Plain Paper Copier) or the like, since the stepping motor has a high efficiency. Moreover, there has been a recently growing interest in preventive safety technologies to prevent traffic accidents from occurring by making vehicles more intelligent. One such preventive safety technologies to be realized is driving environment recognition, specifically inter-vehicle distance control technology using laser radar and image recognition technology. A device for such a technology requires a laser scanner using a stepping motor and a rotary polygon mirror.

A two-phase stepping motor is mainly employed for use requiring a medium accuracy, while a three-phase stepping motor excellent in cost performance is employed for use requiring high-accuracy, low vibration and low noise. As a stepping motor for office machines such as a laser printer and facsimile equipment or the like requiring accuracy in positioning and little unevenness in rotation, a three-phase machine has been often employed in order to obtain high resolution and high torque. The three-phase machine comprises a cylindrical permanent magnet type rotor formed with multiple magnets in a cylindrical shape, or a hybrid type rotor having a permanent magnet held between two magnetic plates formed with multiple pole teeth, and a stator formed with pole teeth opposite the rotor surface.

The stepping motor having the permanent magnet rotor was accurately step-driven one step angle at a time by a driving pulse input from an outer part and an output shaft of the motor rotated as if intermittently driven. Moreover, there was a growing tendency to use rare earth magnets for the permanent magnet to be employed as a rotor in order to obtain higher driving torque. The permanent magnet is magnetized with different poles alternately in strips circumferentially and the magnet surface magnetic flux density measured along the circumference of the magnet was shown as a substantially trapezoidal distribution. Further, a trapezoidal or triangular surface of the magnetic pole teeth of a stator yoke is often employed in order to obtain high torque.

The three-phase machine provided with the cylindrical permanent magnet type rotor or the hybrid type rotor and the stator formed with pole teeth is capable of obtaining high resolution and high torque as mentioned above. Since the distribution of the surface magnetic flux density of the magnetized permanent magnet is substantially trapezoidal circumferentially, step-like driving is easily achieved when the output torque is increased. On the other hand, it also has drawbacks such as increased vibration upon driving and stopping the rotor and it makes smooth driving difficult. That is, noise or vibration is generated by a vibration torque component contained in the torque generated by the product of excitation electric currents and field magnetic flux density. Accordingly, the above-mentioned construction wherein a large number of harmonics are contained in the field magnetic flux density generated in an air gap between the permanent magnet of the rotor and the stator increases noise and vibration.

Publications of Japanese Patent Application Nos. Hei 05-221388 and Hei 09-325197 disclose a permanent magnet type stepping motor to lower damping of a rotor in starting or stopping a motor by solving such problems and rotating the rotor smoothly.

According to the publication of Japanese Patent Application No. Hei 05-221388, the permanent magnet of the rotor is skew-magnetized, the magnetic flux distribution in the magnetized surface of the permanent magnet is made to be substantially sinusoidal circumferentially and the magnetic pole teeth of a stator yoke are made to be rectangular.

Moreover, according to the publication of Japanese Patent Application No. Hei 09-325197, the relation between the number of stator poles Q and the number of S-pole and N-pole pairs of the rotor N is Q=6 k, and are set so as to satisfy N=yk(6n±1), and the magnetic poles of the stator are excited in a two-phase/three-phase excitation mode.

The stepping motor in accordance with each of the publications as mentioned above, however, has the following problems. Although the magnetized state of the rotor in a substantially sinusoidal shape circumferentially is to lower vibration and noise in Japanese Patent Application No. Hei 05-221388, the permanent magnet has an outer diameter configuration in which a slightly uneven cross-section which continues in each of the magnetic poles and is furthermore skew-magnetized, which makes manufacturing difficult. Moreover, the publication only discloses that a suitable number of magnetic poles (N-pole, S-pole) are skew-magnetized, but it does not describe the number of poles.

According to the publication Patent Application No. Hei 05-221388, the relation between the number of the stator poles and the number of pairs of rotors is set so that the magnetic poles of the stator are excited in a two-phase/three-phase excitation mode; however, the magnetized state of the rotor is not described.

Further, when there is a steep load change of a rotating shaft and the rotation stops due to step out, the stepping motor according to each of the above-mentioned publications remains in the stopped state. As a result, excessive current flows when the resistance value of stator windings is small without back electromotive force being generated. The flow of the excessive current increases the temperature of an adhesive or the like fixing the windings, which may cause problems such as poor insulation.

SUMMARY OF THE INVENTION

In view of the foregoing problems, it is an object of the present invention to provide a stepping motor having low vibration, a stepping motor device which prevents the stepping motor from being damaged by restarting in a case of a steep load change of a rotating shaft and the rotation stops due to step out, and a driving method thereof.

In order to achieve the foregoing object, a stepping motor according to a first aspect of the present invention comprises a permanent magnet type rotor with a plurality of poles secured to a rotating shaft and a stator having stator magnetic poles with stator magnetic pole teeth in which excitation windings are wound on a plurality of magnetic poles in a star or delta connection, wherein the rotor is magnetized in different directions alternately circumferentially to satisfy the following equation: M=4F/3 where M is the number of poles of the rotor and F is the number of the stator magnetic poles, the rotor is cylindrical in shape with the stator rotatably disposed inside, disposed opposing the surfaces of the stator magnetic pole teeth through an air gap which is of a uniform dimension throughout the circumference between the surfaces of the stator magnetic pole teeth of the stator and the rotor, and the surface magnetic flux distribution thereof has a substantially sinusoidal wave form circumferentially. This results in a stepping motor with smooth rotation. Also, in a conventional stepping motor, in order to make the magnetic flux distribution after magnetization approach a rectangular shape, a magnetic body such as iron is further provided on the magnetic body that has been magnetized to make the magnetic flux uniform. According to the present invention, however, a permanent magnet type rotor construction can be simplified by having the magnetic flux magnetized in a substantially sinusoidal shape circumferentially without providing a magnetic body such as iron for making the magnetic flux uniform.

In a preferred form according to the first aspect of the present invention, in the stepping motor, a cylindrical bearing holder is provided for securing the rotating shaft in a predetermined location in an enclosure, the bearing holder vertically mounted by caulking to a base on which the stepping motor is mounted, and the rotor is disposed opposing the outside of the stator through the air gap which is of a uniform dimension throughout the circumference between the rotor and the stator magnetic pole teeth surfaces and secured to the rotating shaft rotatably provided by a pair of bearings opposing one another through the bearing holder for securing the rotating shaft. As a result, a stepping can be mounted to the base using a simple construction.

In another preferred form according to the first aspect of the present invention, in the stepping motor, the bearing holder has an arc-shaped deformation preventing groove to prevent deformation due to the caulking. Accordingly, it can be prevented to occur mounting problems such as the stepping motor detaching from the base after it has been mounted thereon.

In still another preferred form according to the first aspect of the present invention, in the stepping motor, the arc-shaped deformation preventing groove is provided along the circumference at the side end contacting the base to which the stepping motor is mounted. Accordingly, occurrence of mounting problems such as the stepping motor detaching from the base due to external force from various directions after the motor has been mounted on the base can be prevented.

In yet another preferred form according to the first aspect of the present invention, in the stepping motor, the rotor is provided opposing the stator magnetic poles on a rotor yoke secured to the rotating shaft and a notch is provided in the rotor yoke in order to leak magnetism of the rotor, and a leakage flux detector for detecting leaking magnetic flux from the rotor is provided in a position opposing the notch. As a result, the stepping motor can detect stopping of the stepping motor due to a steep load change.

In another preferred form according to the first aspect of the present invention, in the stepping motor, a leakage flux detector for detecting changes in magnetic poles is provided on a cylinder end surface of a cylindrical permanent magnet provided in a cylindrical shape opposing the stator magnetic poles on the rotor yoke secured to the rotating shaft. As a result, the stepping motor can detect the positions of magnetic poles of the permanent magnet.

In yet another preferred form according to the first aspect of the present invention, in the stepping motor, a rotary polygon mirror secured to the rotating shaft which is rotatably provided through the cylindrical bearing holder vertically mounted on the base to which the stepping motor is mounted, which rotates along with the rotating shaft, is provided on the outer periphery of the rotor yoke with each mirror surface corresponding to a magnetic pole of the permanent magnet rotor of the stepping motor. As a result, a device for measuring the inter-vehicle distance, direction, and relative speed of a preceding vehicle can be made less expensive.

A stepping motor device according to a second aspect of the present invention comprises: a stepping motor including a permanent magnet type rotor with a plurality of poles secured to a rotating shaft, a stator having stator magnetic poles with stator magnetic pole teeth in which excitation windings are wound on a plurality of magnetic poles in a star or delta connection, and a rotary polygon mirror provided on the outer periphery of a rotor yoke rotatable along with the rotating shaft with each mirror surface corresponding to a magnetic pole of the rotor, wherein the rotor is magnetized in different directions alternately circumferentially to satisfy the following equation: M=4F/3 where M is the number of poles of the rotor and F is the number of the stator magnetic poles, the rotor is cylindrical in shape with the stator rotatably disposed inside, disposed opposing to the surfaces of the stator magnetic pole teeth through an air gap which is of a uniform dimension throughout the circumference between the surfaces of the stator magnetic pole teeth of the stator and the rotor, and the surface magnetic flux distribution thereof has a substantially sinusoidal wave form circumferentially; a leakage flux detector for detecting changes in magnetic poles provided on a cylinder end surface of the rotor of the stepping motor; a driving means to control rotation of the stepping motor by impressing a driving signal in a three-phase single-two-phase excitation mode to three excitation feeding terminals in a star or delta connection wound on a plurality of magnetic poles of the stepping motor; and a means to detect the position of the rotary polygon mirror by a signal from the leakage flux detector. As a result, a device for measuring the inter-vehicle distance, direction, and relative speed of a preceding vehicle is can be made less expensive.

A stepping motor device according to a third aspect of the present invention comprises: a stepping motor including a permanent magnet type rotor with a plurality of poles secured to a rotating shaft, and a stator having stator magnetic poles with stator magnetic pole teeth in which excitation windings are wound around a plurality of magnetic poles in a star or delta connection, wherein the rotor is magnetized in different directions alternately circumferentially to satisfy the following equation: M=4F/3 where M is the number of poles of the rotor and F is the number of the stator magnetic poles, the rotor is cylindrical in shape with the stator rotatably disposed inside, disposed opposing the surfaces of the stator magnetic pole teeth through an air gap which is of a uniform dimension throughout the circumference between the surfaces of the stator magnetic pole teeth of the stator and the rotor, and the surface magnetic flux distribution thereof has a substantially sinusoidal wave form circumferentially; a driving means to impress a driving signal in a three-phase single-two-phase excitation mode to three excitation feeding terminals and to control rotation of the stepping motor by a signal from a leakage flux detector for detecting magnetic flux leaking from a notch provided in a rotor yoke; and a means to repeat the processing to control the rotation a predetermined number of times and to issue a warning when normal rotation is not obtained. As a result, the device can detect stopping of the stepping motor due to a steep load change, thereby preventing the motor from being damaged.

A method of driving a stepping motor device according to a fourth aspect of the present invention, the stepping motor device comprising: a stepping motor including a permanent magnet type rotor with a plurality of poles secured to a rotating shaft and a stator having stator magnetic poles with stator magnetic pole teeth in which excitation windings are wound around a plurality of magnetic poles in a star or delta connection, wherein the rotor is magnetized in different directions alternately circumferentially to satisfy the following equation: M=4F/3 where M is the number of poles of the rotor and F is the number of the stator magnetic poles, the rotor is cylindrical in shape with the stator rotatably disposed inside, disposed opposing the surfaces of the stator magnetic pole teeth through an air gap which is of a uniform dimension throughout the circumference between the surfaces of the stator magnetic pole teeth of the stator and the rotor, and the surface magnetic flux distribution thereof has a substantially sinusoidal wave form circumferentially; and a driving means to impress a driving signal in a three-phase single-two-phase excitation mode to three excitation feeding terminals and to control rotation of the stepping motor by a signal from a leakage flux detector which detects magnetic flux leaking from a notch provided in a rotor yoke, comprising the steps of: driving the stepping motor by impressing the driving signal in the three-phase single-two-phase excitation mode to the three excitation feeding terminals in a star or delta connection wound on a plurality of magnetic poles of the stepping motor, detecting the signal from the leakage flux detector and comparing the changing speed of the signal of the leakage flux detector with the driving signal of the stepping motor, stopping supply of the driving signal of the stepping motor when there is a difference equal to or greater than a certain value in the comparison results, supplying the driving signals again after a predetermined time, repeating stopping and supplying processes of the driving signal for a predetermined number of times; and issuing a warning when normal rotation is not obtained. Accordingly, reliability of the device for measuring the inter-vehicle distance, direction and relative velocity of a preceding vehicle can be improved.

BRIEF DESCRIPTION OF THE DRAWINGS

In the accompanying drawings:

FIGS. 2A and 2B show the stepping motor in FIG. 1 viewed from top, in which FIG. 2A is a top plan view thereof and FIG. 2B is an enlarged view of part B in FIG. 2A;

FIGS. 3A, 3B and 3C explain a rotor yoke of a stepping motor of the present invention, in which FIG. 3A is a sectional view in the PR direction, FIG. 3B is a plan view and FIG. 3C is a view showing the side with a notch 8 viewed from the QK direction;

FIGS. 4A, 4B, 4C, 4D and 4E show a bearing holder, in which FIG. 4A is a bottom plan view in the B direction in FIG. 4B, FIG. 4B is a partially sectional view in the A direction in FIG. 4A, FIG. 4C is an enlarged view of part B in FIG. 4B, FIG. 4D is a view showing deformation of a caulk portion in the case where a deformation preventing groove is provided, and FIG. 4E is a view showing deformation of the caulk portion in the case where the deformation preventing groove is not provided;

FIGS. 5A and 5B explain the relation between a permanent magnet and stator magnetic poles, in which FIG. 5A shows arrangement of the permanent magnet and the stator magnetic poles and FIG. 5B is a view showing a magnetized state of the permanent magnet;

FIGS. 7A, 7B and 7C explain the relation between a driving signal and current in the case where a stepping motor is driven in three-phase single-two-phase excitation mode, in which FIG. 7A is a diagram showing the relation with an excitation signal in each step, FIG. 7B shows a driving signal in each step and FIG. 7C is a diagram showing changes in current flowing in a stator winding in each step;

FIGS. 8A to 8F are diagrams showing how a rotor rotates at the time of excitation by the driving signal shown in FIGS. 7A, 7B and 7C, in which FIGS. 8A to 8F correspond to each of the steps in FIGS. 7A, 7B and 7C, respectively; and FIG. 9 shows the relation between the rotary magnetic field and the rotor on the excitation of the stator windings of the stepping motor in the present invention, in which ① to ⑥ correspond to each of the steps in FIGS. 7A, 7B and 7C, respectively.

DETAILED DESCRIPTION OF THE PREFERRED EMBODIMENTS

Hereinafter, embodiments of the present invention will be described with reference to the drawings.

Figure 1:
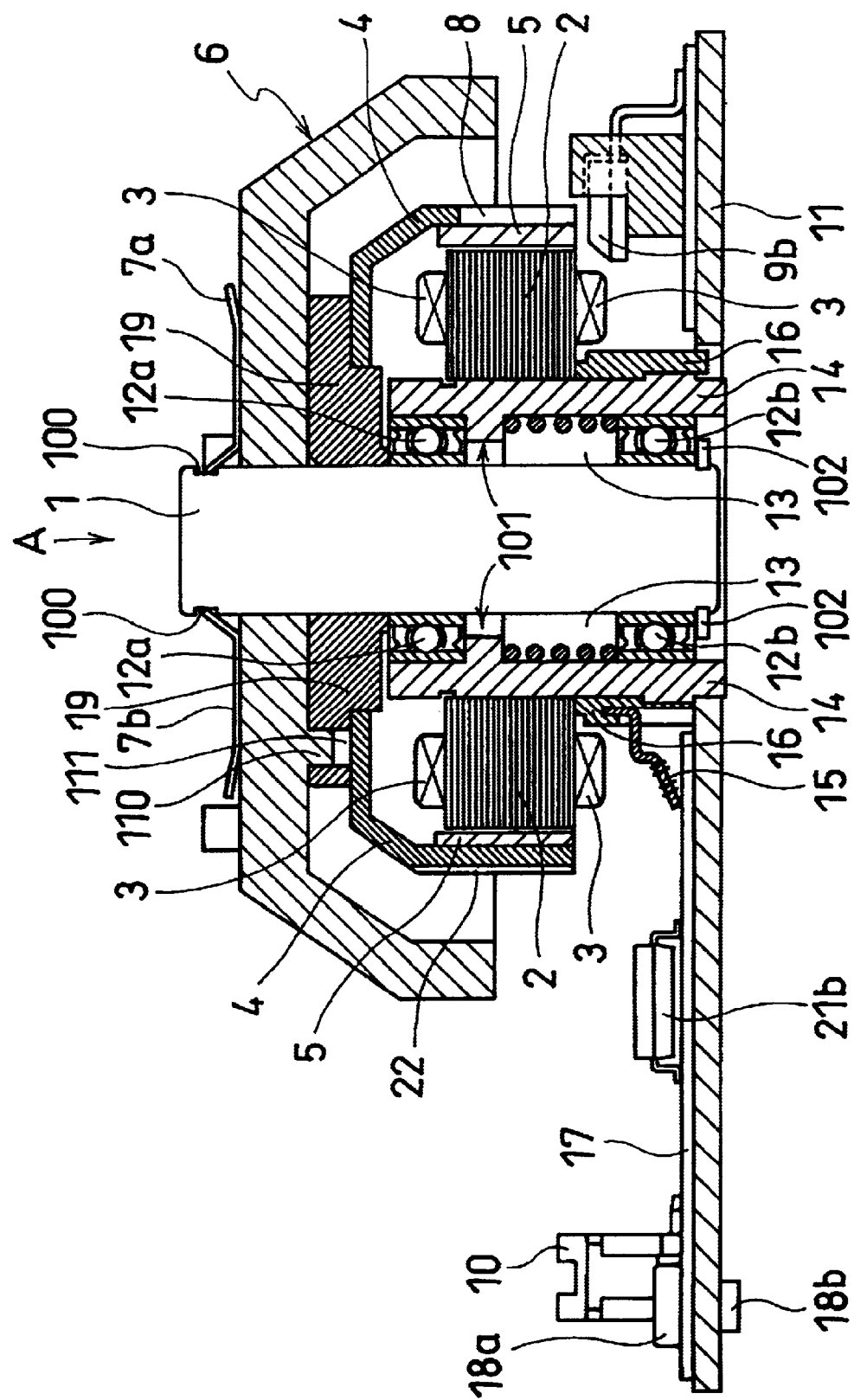
FIG. 1 is a side sectional view showing an embodiment of a stepping motor of the present invention.

FIG. 1 is a side sectional view of an embodiment of a stepping motor according to the present invention. A column-like rotating shaft 1 is rotatably provided to a cylindrical bearing holder 14 through bearings 12a and 12b. The bearing holder 14 is vertically mounted on a plate 11 by a method described later with a spacer 16 at the outer periphery of the bearing holder 14. A protruding portion 101 is provided inside of the bearing holder 14 so that the upper bearing 12a does not fall. Moreover, a spring 13 is compressed to be inserted in between the protruding portion 101 and the lower bearing 12b. A ring 102 is provided to the lower part of the rotating shaft 1 so that the bearing 12b does not fall. The spring 13 is compressed to be inserted in between the protruding portion 101 and the lower bearing 12b, whereby generated repulsive force holds the bearing 12b downward so that the rotating shaft 1 does not move up and down.

The spacer 16 is provided with stator magnetic poles 2, for example, made of laminated silicon steel plate or the like in the structure described later fitted to the bearing holder 14 which is supported so as not to fall downward by the spacer 16. The stator magnetic pole 2 is wound by a stator winding 3 described later. The stator winding 3 is led out to the outer portion by a connector 10 through a driver circuit and a drive circuit (not shown) provided on a printed circuit board 17 in connection with pins 15 and connected with a microcomputer (MPU) for control (not shown). The pins 15 are connected to four pieces in total: three-phase stator windings 3 and a neutral point of the stator windings 3 as described later.

A rotor yoke 4 of a magnetic body fitted on a bush 19 made of a nonmagnetic body such as stainless steel provided and secured to the rotating shaft 1 is rotatably provided opposing the stator magnetic poles 2. A permanent magnet 5, for example, made of a rare earth magnet or the like is provided along a circumference between the stator magnetic poles 2 and the rotor yoke 4 at the side where they face one another. And an air gap which is of a uniform dimension is provided between the permanent magnet and stator magnetic pole teeth (not shown) provided at the stator magnetic poles 2. The rotor yoke 4 and the permanent magnet 5 are secured by means of an adhesive or the like.

The magnetic pole teeth of the stator magnetic poles have a structure along the circumference of the circle as shown in FIG. 5 in detail; therefore, a peripheral shape of the permanent magnet 5 provided with the air gap which is of a uniform dimension between the permanent magnet 5 and the stator magnetic pole teeth is also circular. Accordingly, the permanent magnet 5 is in a cylindrical shape with the stator inside of it. Incidentally, the positions of the rotor and the stator may be reversed. That is, the permanent magnet 5 to be the rotor may be inside and the stator magnetic poles to be the stator may be outside thereof.

The permanent magnet 5 is magnetized with alternately different polarities circumferentially from the cylindrical magnetic body. The surface magnetic flux distribution thereof has a substantially sinusoidal wave form circumferentially. The magnetization is performed by inserting an electromagnet, which is arc-shaped and which has a predetermined number of magnetized poles wound by windings, along the internal portion of the cylindrical magnetic body and flowing a direct current.

A rotary polygon mirror 6 is provided on upper portion of the bush 19, which is secured by fitting in a ring 100 provided on the rotating shaft 1 with 6 metal pieces 7a and 7b (others not shown) provided on upper part of the rotary polygon mirror 6. The rotary polygon mirror 6 is provided with a protruding portion 110 for adjusting the position of the bush 19. Positioning of the rotary polygon mirror 6 with the rotor yoke 4 is carried out by fitting the bush 19 in a bore 111 thereon.

A positioning groove 22 is aligned with a positioning groove (not shown) provided in the permanent magnet 5 so as to position the permanent magnet 5 and the rotor yoke 4, thereby positioning of the rotary polygon mirror 6, the rotor yoke 4 and the permanent magnet 5.

A leakage flux detector 9 comprising a hall element to detect magnetic flux leaking from the permanent magnet 5 is provided on the lower part where the permanent magnet 5 rotates, which detects the strength of the magnetic pole changing in accordance with the rotation of the permanent magnet 5. As mentioned above, the positions of the rotary polygon mirror 6 and the permanent magnet 5 are set, thereby the position of the rotary polygon mirror 6 is found by detecting the output of the leakage flux detector 9.

The printed circuit board 17 is secured to the plate 11 by a bolt 18a and a nut 18b.

FIGS. 2A and 2B show the stepping motor in FIG. 1 viewed from above, in which FIG. 2A is a top plan view thereof and FIG. 2B is an enlarged view of part B in FIG. 2A. In FIG. 2A, the rotary polygon mirror 6 has six leaves of mirrors, however, the number of mirrors is not limited thereto. The rotary polygon mirror 6 is secured by fitting six metal pieces 7a and 7b (others not shown) or the like provided on the upper part of the rotary polygon mirror 6 as mentioned in FIG. 1 into the ring 100 provided on the rotating shaft 1 and into six notches (not shown) provided in the upper part of the rotary polygon mirror 6, respectively.

A driver circuit 21b is provided on the printed circuit board 17 and connected to the rotor windings 3 through a printed wiring (not shown) by a method described later. Moreover, the driver circuit 21b is connected to a drive circuit 21a through the printed wiring (not shown). The drive circuit 21a is connected to a connector 10 through the printed wiring (not shown).

The pins 15 to connect the rotary windings 3 comprise 15a, 15b, 15c and 15d, which are connected to stator winding terminals U, V and W described later and a neutral point N of the rotor winding, respectively. Each of the pins 15 is connected to the driver circuit 21b through the printed wiring (not shown) provided on the printed circuit board 17. Incidentally, to prevent accidents such as disconnection of the circuit, a short circuit or the like caused by the connecting part of the neutral point N of the stator winding swinging due to vibration or the like, the pin 15d is connected to the neutral point N of the stator winding, but is not connected to the driver circuit 21b.

At a position opposite the permanent magnet 5, a leakage flux detector 9a is provided which will be described later.

In FIG. 2B, the positioning groove 22 is aligned with a positioning groove 23 provided in the permanent magnet 5 so as to position the permanent magnet 5 and the rotor yoke 4, thereby positioning the rotary polygon mirror 6, the rotor yoke 4 and the permanent magnet 5.

Figure 3A:
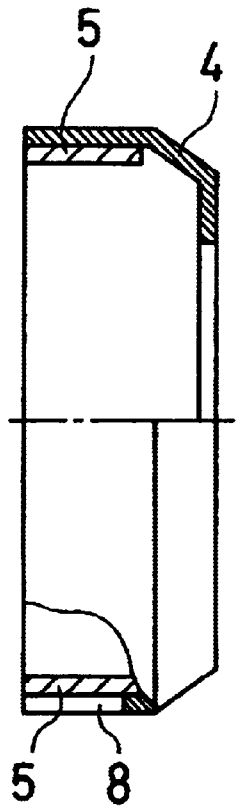
Figure 3B:
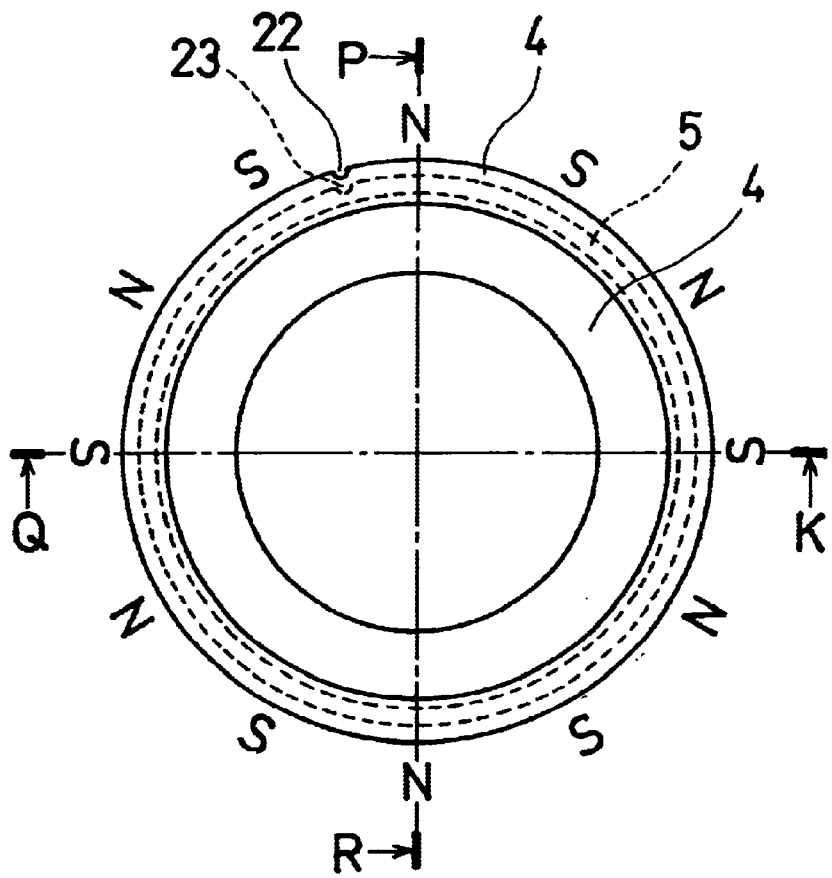
Figure 3C:
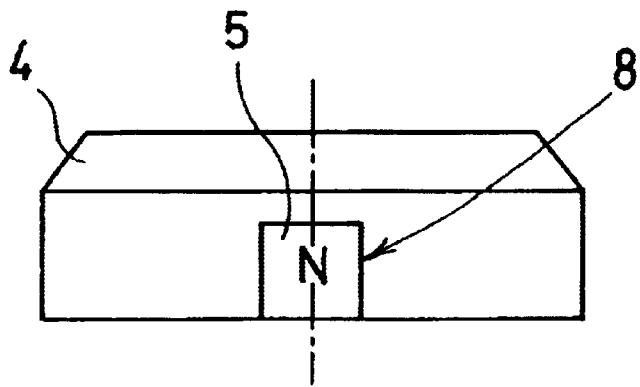

FIGS. 3A, 3B and 3C are explanatory views of the rotor yoke 4 of the stepping motor according to the present invention, in which FIG. 3A is a sectional view in the PR direction, FIG. 3B is a top plan view and FIG. 3C is a view showing the side with a notch 8 viewed from the QK direction. The permanent magnet 5 is adhered to the inside of the rotor yoke 4. The notch 8 having a length which does not exceed that of a pole in the rotational direction of the permanent magnet 5, for example, which is approximately 70% thereof, is provided in a part of the rotary yoke 4 so that the magnetic flux of the permanent magnet 5 is easily leaked. There may be a plurality of notches 8, not only one. Moreover, their may be a plurality of leakage flux detectors 9a, not only one.

The notch 8 is provided aligned with a predetermined position of the magnetic pole at the maximum magnetic flux density. Such positioning is carried out as follows. The relative location of the positioning groove 22, the positioning groove 23 and the notch 8 is set so that when the positioning groove 22 is aligned with the positioning groove 23 provided in the permanent magnet 5, the notch portion 8 aligns with a location of the maximum magnetic flux density at predetermined pole of the permanent magnet 5.

The leakage flux detector 9a as shown in FIGS. 2A and 2B is provided to a position opposite the notch 8. The leakage flux detector 9a detects the magnetic flux leaking from the permanent magnet 5 and functions as described later.

Figure 4A:
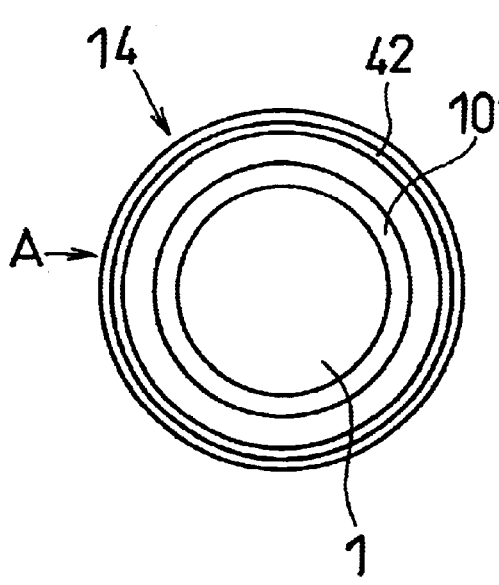
Figure 4B:
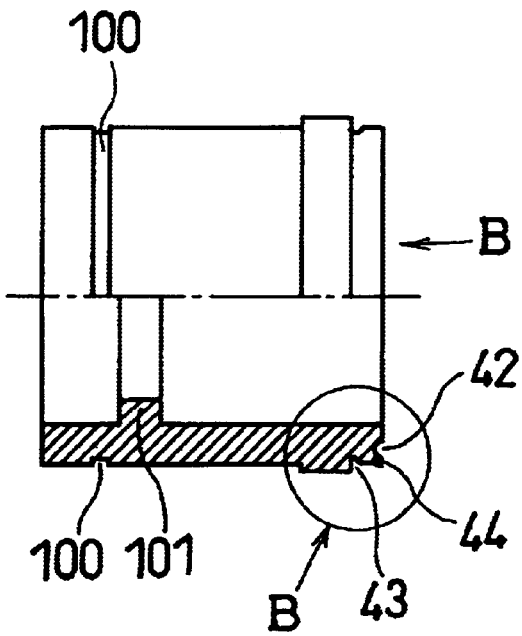
Figure 4C:
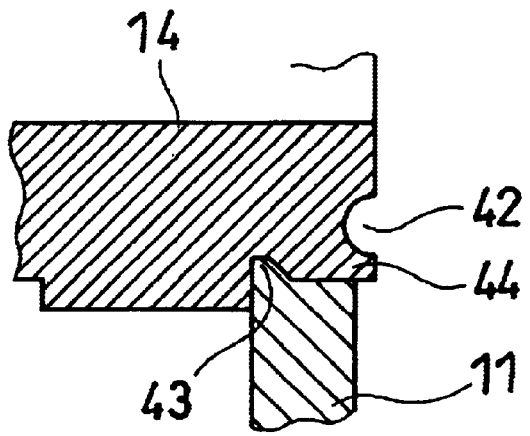
Figure 4D:
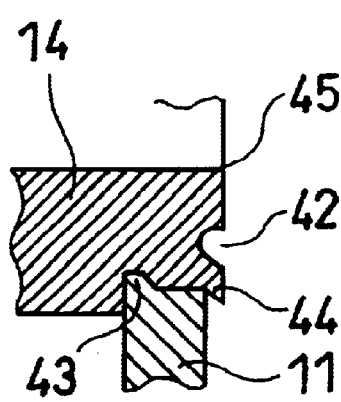
Figure 4E:
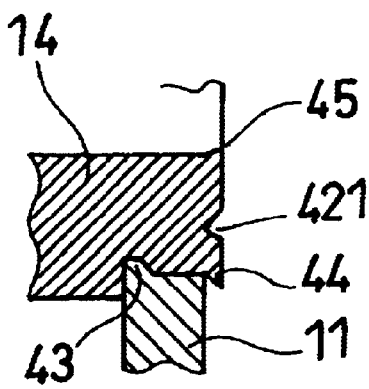

FIGS. 4A, 4B, 4C, 4D and 4E are views of the bearing holder 14, in which FIG. 4A is a bottom plan view from the B direction in FIG. 4B, FIG. 4B is a segmental sectional view of the bearing holder 14 viewed from the A direction in FIG. 4A, FIG. 4C is an enlarged view of part B in FIG. 4B, FIG. 4D is a view showing deformation of a caulk portion 44 in the case where an arc-shaped groove 42 is provided, and FIG. 4E is a view showing deformation of the bottom of the bearing holder 14 in the case where the groove 42 is not provided.

The bearing holder 14 is in a cylindrical shape as shown in FIG. 4A. The protruding portion 101 provided inside the cylinder secures the bearing 12b by repulsive force of the spring 13.

As shown in FIG. 4B, the ring 100 securing six metal pieces provided on the upper portion of the rotary polygon mirror 6 and a constricted part 43 to be fitted to a plate 11 are provided at the upper part and at the lower part, respectively, throughout the outer circumference of the bearing holder 14. Moreover, the caulk portion 44 and an arc-shaped groove 42 for preventing deformation due to caulking are provided at the bottom of the bearing holder 14 throughout the circumference.

The bearing holder 14 is inserted in a mounting hole (not shown) which is provided in a plate 11 and vertically mounted on the plate 11 by being fitted as follows. The bearing holder 14 inserted into the mounting hole (not shown) provided in the plate 11 is fitted to the plate 11 by applying pressure to the caulk portion 44 provided on the bottom in the arrow B direction of FIG. 4B, that is, in the direction of the cylinder of the bearing holder 14. The caulk portion 44 to which the pressure is applied is deformed outside of the cylinder as shown in FIG. 4D.

In the outwardly deformed caulk portion 44, the constricted part 43 to be fitted to the plate 11 and the deformed caulk portion 44 sandwich the plate 11 to secure the bearing holder 14 to the plate 11. Moreover, at an inside 45 of the cylinder, warp which is absorbed in the arc-shaped groove 42 for preventing the deformation does not extend to the inside 45 of the bearing holder 14. When the arc-shaped groove 42 for preventing the deformation is not provided, a caulk mark 421 is left by the pressure applied in the cylindrical direction of the bearing holder 14 and warp is caused and deforms the inside 45 of the bearing holder 14 as shown in FIG. 4E. The warp and the deformation lower the strength of the bearing holder 14 as well as the fitting force between the bearing holder 14 and the plate 11.

Figure 5A:
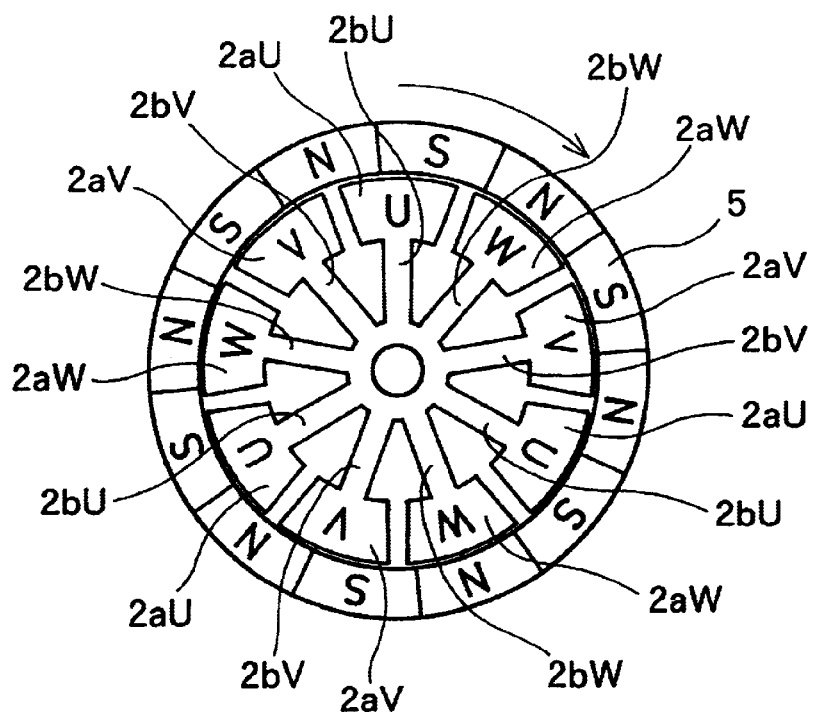
Figure 5B:
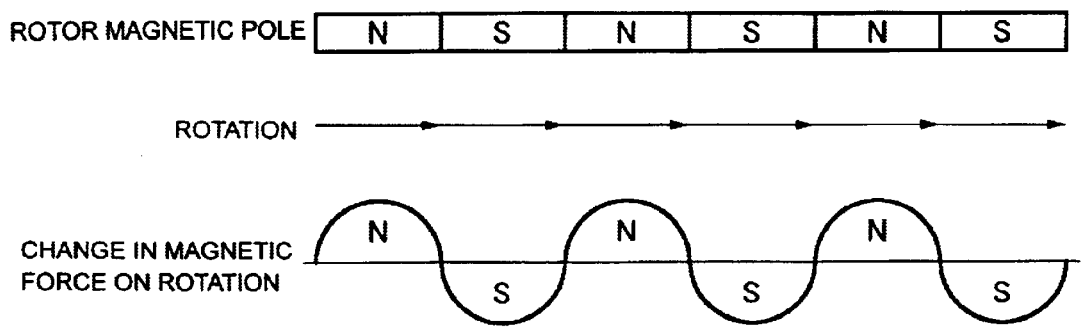

FIGS. 5A and 5B are explanatory views of the relation between the permanent magnet 5 and the stator magnetic poles 2, in which FIG. 5A shows arrangements of the permanent magnet 5 and the stator magnetic poles 2, and FIG. 5B is a view showing the magnetizing state of the permanent magnet 5.

FIG. 5A shows the number of poles of the permanent magnets 5 to be twelve (six pairs of N poles and S poles) and the number of stator magnetic poles 2 being nine. However, the numbers may be other than these as long as the relation between the permanent magnet 5 and the stator magnetic poles 2 is satisfied as described later.

The stator magnetic poles 2 comprise magnetic pole teeth 2$a$U, 2$a$V and 2$a$W and magnetic pole pillars 2$b$U, 2$b$V and 2$b$W on which stator windings (not shown) are wound as described later. Moreover, an air gap wherein the space between the surfaces of the stator magnetic poles 2 and the permanent magnet 5 is of a uniform dimension throughout the circumference is provided at a surface opposite the permanent magnet 5 of the magnet teeth 2$a$U, 2$a$V and 2$a$W.

In the magnetized state of the permanent magnet 5 of the rotor, as shown in FIG. 5B, the magnetic flux distribution on the surface has a substantially sinusoidal wave form circumferentially. In other words, changes from S pole to N pole by the rotation of the permanent magnet 5 modifies magnetic force in a substantially sinusoidal wave form as shown in FIG. 5B.

Figure 6:
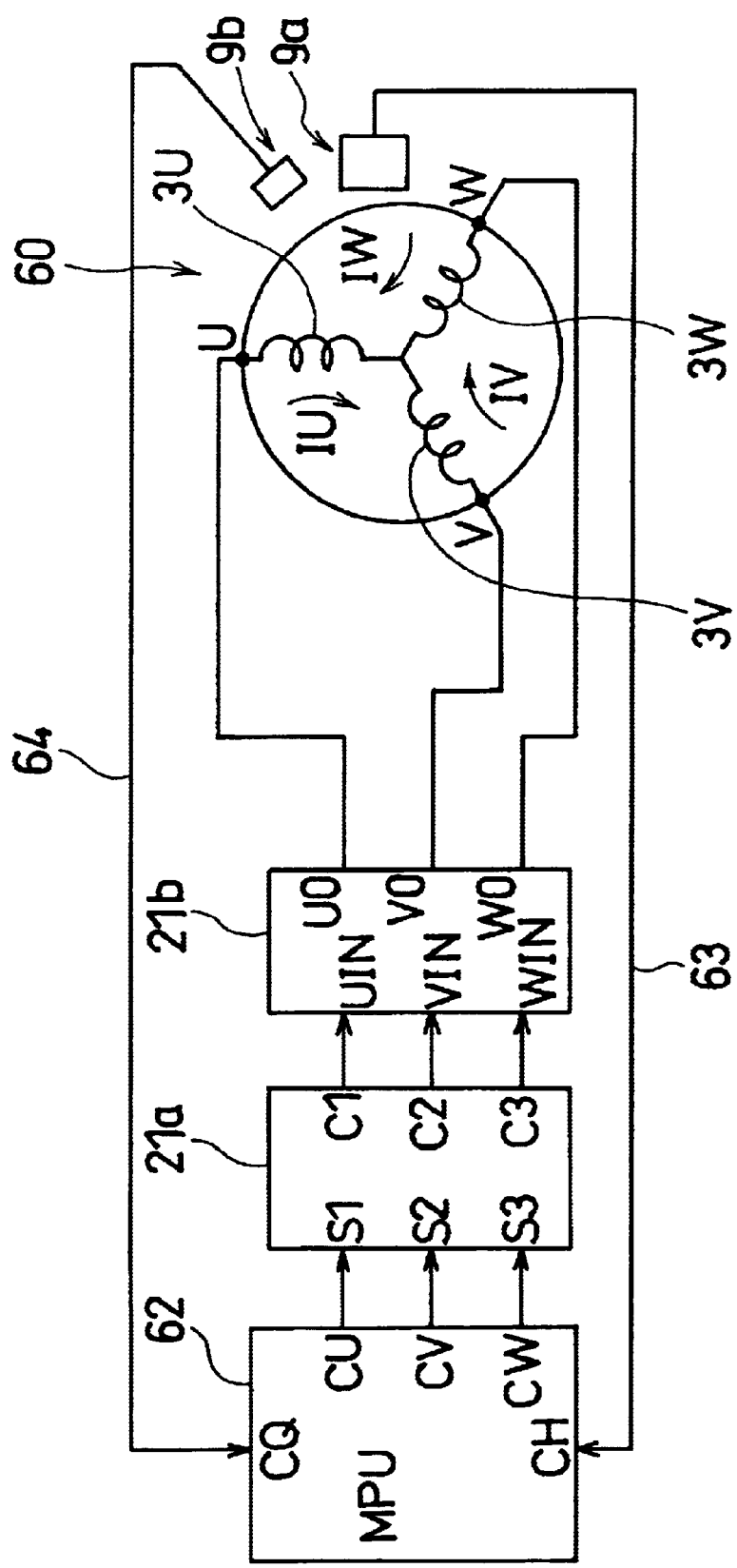
FIG. 6 is a block diagram of an embodiment of a stepping motor device in the present invention.

FIG. 6 is a block diagram of an embodiment of a stepping motor device according to the present invention. The stator winding terminals U, V and W of a stepping motor 60 are connected to output terminals UO, VO and WO of the three-phase driver circuit 21$b$, respectively. Output terminals C1, C2 and C3 of the drive circuit 21$a$ and output terminals CU, CV and CW of an MPU (microcomputer) 62 that is a driving means to control the rotation of the stepping motor 60 are connected to inputs UIN, VIN and WIN of the three-phase driver circuit 21$b$ and input terminals S1, S2 and S3 of the drive circuit 21$a$, respectively. Moreover, output of the leakage flux detectors 9$a$ and 9$b$ comprising a hall element is connected to input terminals CH and CQ of the MPU 62 through signal wires 63 and 64. Incidentally, power source circuits of the driver circuit 21$b$, the drive circuit 21$a$, the MPU 62 and the leakage flux detectors 9 are not shown. Moreover, a predetermined program (not shown) in the MPU (microcomputer) 62 is saved and carries out the processing of the stepping motor device as mentioned later.

The drive circuit 21$a$ carries out switching of each phase to excite the stator winding by a predetermined pulse signal. A signal for generating a signal in a three-phase single-two-phase excitation mode that is a well-known driving method of stepping motor by the drive circuit 21$a$ is outputted from the output terminals CU, CV and CW of the MPU 62. Moreover, stator windings 3U, 3V and 3W of the stepping motor 60 are in a star connection in FIG. 6; however, it may be another connecting method such as a delta connection.

The stator windings 3U, 3V and 3W are wound on magnetic pole pillars 2$b$U, 2$b$V and 2$b$W shown in FIG. 5A, respectively, as follows. That is, the stator winding 3U is wound on the magnetic pole pillar 2$b$U, the stator winding 3V is wound on the magnetic pole pillar 2$b$V, and the stator winding 3W is wound on the magnetic pole pillar 2$b$W, all with an equal number of windings so as to generate magnetic flux in the same direction by a three-phase single-two-phase excitation current, for example, to generate a predetermined magnetic pole, e.g. N pole at a surface where magnetic pole teeth 2$a$U, 2$a$V and 2$a$W oppose the permanent magnet 5 by a current flowing to the respective stator windings.

FIGS. 7A, 7B and 7C explain the relation between a driving signal and a current in the case of driving the stepping motor 60 in the three-phase single-two-phase excitation mode, in which FIG. 7A is a view showing the relation of the exciting signals in each step, FIG. 7B is a view showing the driving signals in each step, and FIG. 7C is a view showing changes of currents IU, IV and IW flowing to the stator windings 3U, 3V and 3W in each step. Regarding the currents IU, IV and IW, the currents flowing from the terminals U, V and W of the stator windings 3U, 3V and 3W are positive and the currents flowing out are negative. The currents flowing from the terminals in FIG. 7C are indicated as a single units of current.

On driving in the three-phase single-two-phase excitation mode, a half cycle is completed in six steps as shown in FIG. 7A. As shown in FIG. 7A, when the stepping motor 60 is driven in the three-phase single-two-phase excitation mode, one or two phases of driving signals are outputted alternately to each of the stator windings 3U, 3V and 3W of the stepping motor 60. In other words, as shown in FIG. 7B, the driving signal is outputted only to an output terminal UO of the driver circuit 21$b$ in step 1, the driving signal is outputted to the output terminals UO, VO of the driver circuit 21$b$ in step 2 and the driving signal is outputted only to the output terminal VO of the driver circuit 21$b$ in step 3.

When the driving signals are impressed to each of the stator windings 3U, 3V and 3W with the timing as shown in FIG. 7A, currents IU, IV, and IW flowing in each of the windings become as shown in FIG. 7C. In other words, when impedance of each winding is equally 2Z, the synthesized impedance between the terminals respectively becomes 3Z whatever the driving signal impressed to each terminal.

For example, in step 1, when the driving signals are impressed only to the stator winding 3U and the other winding terminals are grounded, current IU flows from terminal U to the winding having impedance 2Z and divides into ½ to flow in the stator windings 3V and 3W of impedance 2Z, respectively. Then, in step 2, when the driving signal is impressed to the stator windings 3U and 3V, ½ of the current flowing from the stator winding 3U and ½ of the current flowing from the stator winding 3V merge in the stator winding 3W to be IW and flow out from the terminal W. Similarly, a current of each winding in each step becomes as shown FIG. 7C. As clear from FIG. 7C, the current flowing in each winding does not become a rectangular shaped current at each phase, but becomes a stair-shaped current. The rotor mutually working with the magnetic flux distribution of the permanent magnet type rotor is magnetized in a substantially sinusoidal wave form to be smoothly driven.

FIGS. 8A to 8F are views explaining how the rotor is rotated when the stator winding is excited with driving signals of the three-phase single-two-phase excitation mode as shown in FIGS. 7A, 7B and 7C, in which FIGS. 8A to 8F correspond to each step in FIGS. 7A, 7B and 7C, respectively. Incidentally, in FIGS. 8A to 8F the magnetic poles of the rotor comprise two poles of only an N pole and an S pole for simplifying the description; the others are not shown.

In FIG. 8(a), when the driving signals are impressed only to the stator winding 3U in step 1, a current IU flows from terminal U and the magnetic pole N is generated in the direction between the stator windings 3V and 3W by the current. Similarly, the magnetic pole S is generated to be in the direction between the stator windings 3U and 3V by a current IW flowing from the stator winding 3W. Similarly a magnetic pole N is generated by a current IV flowing from the stator winding 3V and the magnetic pole S is generated so as to be in the direction between the stator windings 3U and 3W. Synthesized magnetic fields of the S pole and N pole generated by each winding become ST and NT as respectively shown.

Similarly, when the driving signals are impressed to the stator windings 3U and 3V in step 2, ½ of the current flows from the stator winding 3U and the remaining ½ flows from the stator winding 3V, respectively, to merge in the stator winding 3W as IW and flow out of the terminal W. The synthesized magnetic fields of the S pole and N pole as mentioned above are rotated 60 degrees to the right, as shown in FIG. 8B and become ST and NT by the current. Similarly, the synthesized magnetic fields ST and NT are rotated in increments of 60 degrees to the right so as to rotate in a complete circle in six steps. The magnetic pole of the rotor is drawn to the rotating magnetic field by the stator winding and rotates in a complete circle in 6 steps. It should be noted that FIGS. 8C to 8F do not show the synthesized magnetic field NT.

FIG. 9 shows the relation between the rotor and the rotating magnetic field at the time of excitation of the stator winding in an embodiment of the present invention, in which ① to ⑥ correspond to each step of FIG. 7A, respectively. In FIG. 9, the number of magnetic poles U, V and W of the stator 90 is three, respectively, the number of the poles is nine in total and the number of the magnetic poles of the rotor 91 is twelve. A driving signal is impressed to each winding (not shown) with the timing shown in FIG. 7A in a manner shown as ① to ⑥ in FIG. 9. In such a case, the rotation angle in one step is 1/12 compared to FIGS. 8A to 8F. The rotor 91 rotates by one magnetic pole in three steps and rotates in a complete circle smoothly in thirty-six steps.

The number of poles is determined as follows.

When the number of stator magnetic poles is F, the number of poles M of the permanent magnet type rotor is determined as follows. That is, in case of driving a stepping motor in three-phase, the number of stator magnetic poles F is a multiple of 3. Since a rotor is provided with a multi-pole rotating magnet having two poles of S and N, the number of pole pairs M/2 of the rotor is a multiple of 2. Accordingly, the number of the stator magnetic poles F is a multiple of 3, and there are various combinations with the number of the stator magnetic poles F, which are a multiple of 2 of the number of the pole pairs M/2 of the permanent magnet type rotor. In the present invention, the relation of the number of the poles of the permanent magnet type rotor M and the number of the stator magnetic poles F is set so as to satisfy M=4F/3 so that the permanent magnet type rotor magnetized in a sinusoidal wave form rotates smoothly.

The movement of a stepping motor device according to the present invention will be illustrated with reference to FIG. 6. The drive circuit 21a generates a signal in a three-phase single-two-phase excitation mode which is a well-known method of driving a stepping motor, and a series of three-phase signals as shown in FIG. 7A are consecutively outputted from the output terminals C1, C2 and C3. The driving signals are impressed to the input UIN, VIN and WIN terminals of the driver circuit 21b. The drive circuit 21a and the driver circuit 21b are realized by a well-known semiconductor integrated circuit available on the market. The impressed driving signals to input are transformed into three-phase currents IU, IV and IW. The MPU 62 generates a signal for actuating the drive circuit 21a by a well-known method.

The three-phase currents IU, IV and IW flow to the stator windings 3U, 3V and 3W from the terminals U, V and W of the stepping motor 60 and the stepping motor 60 is rotated at a predetermined speed.

A driving method of the stepping motor device of the present invention which operates as described above will hereinafter be described. A leakage flux detector 9a provided opposing a notch 8 provided in a part of a rotor yoke 4 detects magnetic flux leaking from a permanent magnet 5 provided on the rotor yoke 4. When the stepping motor 60 rotates, a detecting signal synchronized with the rotation of the rotor yoke 4 is obtained at an input terminal CH of the MPU 62 connected with the output of the leakage flux detector 9a. The detecting signal changes to positive and negative by the leakage flux wherein the N pole and S pole of the permanent magnet 5 are generated alternately. Accordingly, the MPU 62 detects the signal of the input terminal CH and the detected signal changing to positive and negative at a predetermined speed means normal rotation.

In case of some problems, for example, if the stepping motor 60 stops rotating due to a steep increase in load, the output of the leakage flux detector 9a does not change to positive and negative and a certain value or a changing speed is lowered. When the output changing speed of the leakage flux detector 9a and output signals to the drive circuit 21a driving the stepping motor are compared and there is a difference equal or less than a certain value, the MPU 62 stops supplying the driving signal. Then after a predetermined time, it supplies the driving signal again. The MPU 62 repeats the supply of the driving signal for a predetermined number of times. When the rotation of the stepping motor 60 is not normal, the MPU 62 issues a notification of malfunctioning to a lamp (not shown) or a system to which the stepping motor 60 is mounted.

The leakage flux detector 9b detects magnetic flux coming out of the lower part of the rotor yoke 4. The position of the rotor yoke 4 is set in relation to the rotary polygon mirror 6 as mentioned above. Accordingly, a relative position of the rotary polygon mirror 6 can be found by detecting the changes of the magnetic flux of the rotor yoke 4. The MPU 62 inputs the output of the leakage flux detector 9b via a signal line 64 to find the position of the rotary polygon mirror 6 and outputs to a device (not shown) for measuring the inter-vehicle distance, direction, and relative speed of a preceding vehicle.

Since the position of the rotary polygon mirror 6 where the output of the leakage flux detector 9a changes is fixed, the absolute position of the rotary polygon mirror 6 can be found by processing this along with the output of the leakage flux detector 9b.

What is claimed is:

1. A stepping motor comprising:
    a permanent magnet type rotor with a plurality of poles secured to a rotating shaft and a stator having stator magnetic poles with stator magnetic pole teeth in which excitation windings are wound on a plurality of magnetic poles in a star or delta connection,
    wherein the rotor is magnetized in different directions alternately circumferentially to satisfy the following equation: M=4F/3 where M is the number of poles of the rotor and F is the number of the stator magnetic poles,
    the rotor is cylindrical in shape with the stator rotatably disposed inside, disposed opposing the surfaces of the stator magnetic pole teeth through an air gap which is of a uniform dimension throughout the circumference between the surfaces of the stator magnetic pole teeth of the stator and the rotor,
    and the surface magnetic flux distribution thereof has a substantially sinusoidal wave form circumferentially.

2. A stepping motor according to claim 1, further comprising a cylindrical bearing holder for securing the rotating shaft in a predetermined location in an enclosure, the bearing holder vertically mounted by caulking to a base on which the stepping motor is mounted,
    wherein the rotor is disposed opposing the outside of the stator through the air gap which is of a uniform dimension throughout the circumference between the rotor and the stator magnetic pole teeth surfaces and secured to the rotating shaft rotatably provided by a pair of bearings opposing one another through the bearing holder.

3. A stepping motor according to claim 2, wherein the bearing holder has an arc-shaped deformation preventing groove to prevent deformation due to the caulking.

4. A stepping motor according to any one of claims 1, wherein the arc-shaped deformation preventing groove is provided along the circumference at the side end contacting the base to which the stepping motor is mounted.

5. A stepping motor according to any one of claims 1, wherein the rotor is provided opposing the stator magnetic poles on a rotor yoke secured to the rotating shaft and a notch is provided in the rotor yoke in order to leak magnetism of the rotor,
    further comprising a leakage flux detector for detecting leaking magnetic flux from the rotor, the leakage flux detector provided in a position opposing the notch.

6. A stepping motor according to any one of claims 1, further comprising a leakage flux detector for detecting changes in magnetic poles, the leakage flux detector provided on a cylinder end surface of a cylindrical permanent magnet provided in a cylindrical shape opposing the stator magnetic poles on the rotor yoke secured to the rotating shaft.

7. A stepping motor according to claim 5, further comprising a rotary polygon mirror secured to the rotating shaft which is rotatably provided through the cylindrical bearing holder vertically mounted on the base to which the stepping motor is mounted, which rotates along with the rotating shaft, the rotary polygon mirror provided on the outer periphery of the rotor yoke with each mirror surface corresponding to a magnetic pole of the rotor of the stepping motor.

8. A stepping motor device comprising:
    a stepping motor including
        a permanent magnet type rotor with a plurality of poles secured to a rotating shaft,
        a stator having stator magnetic poles with stator magnetic pole teeth in which excitation windings are wound on a plurality of magnetic poles in a star or delta connection, and
        a rotary polygon mirror provided on the outer periphery of a rotor yoke rotatable along with the rotating shaft with each mirror surface corresponding to a magnetic pole of the rotor,
        wherein the rotor is magnetized in different directions alternately circumferentially to satisfy the following equation: M=4F/3 where M is the number of poles of the rotor and F is the number of the stator magnetic poles,
    the rotor is cylindrical in shape with the stator rotatably disposed inside, disposed opposing the surfaces of the stator magnetic pole teeth through an air gap which is of a uniform dimension throughout the circumference between the surfaces of the stator magnetic pole teeth of the stator and the rotor, and
    the surface magnetic flux distribution thereof has a substantially sinusoidal wave form circumferentially;
        a leakage flux detector for detecting changes in magnetic poles provided on a cylindrical end surface of the rotor of the stepping motor;
        a driving means to control rotation of the stepping motor by impressing a driving signal in a three-phase single-two-phase excitation mode to three excitation feeding terminals in a star or delta connection wound on a plurality of magnetic poles of the stepping motor; and
        a means to detect the position of the rotary polygon mirror by a signal from the leakage flux detector.

9. A stepping motor device comprising:
    a stepping motor including a permanent magnet type rotor with a plurality of poles secured to a rotating shaft, and
        a stator having stator magnetic poles with stator magnetic pole teeth in which excitation windings are wound around a plurality of magnetic poles in a star or delta connection,
        wherein the rotor is magnetized in different directions alternately circumferentially to satisfy the following equation: M=4F/3 where M is the number of poles of the rotor and F is the number of the stator magnetic poles,
    the rotor is cylindrical in shape with the stator rotatably disposed inside, disposed opposing the surfaces of the stator magnetic pole teeth through an air gap which is of a uniform dimension throughout the circumference between the surfaces of the stator magnetic pole teeth of the stator and the rotor, and
    the surface magnetic flux distribution thereof has a substantially sinusoidal wave form circumferentially;
        a driving means to impress a driving signal in a three-phase single-two-phase excitation mode to three excitation feeding terminals and to control rotation of the stepping motor by a signal from a leakage flux detector for detecting magnetic flux leaking from a notch provided in a rotor yoke; and a means to repeat the processing to control the rotation a predetermined number of times and to issue a warning when normal rotation is not obtained.

10. A stepping motor according to any one of claim 2, wherein the arc-shaped deformation preventing groove is provided along the circumference at the side end contacting the base to which the stepping motor is mounted.

11. A stepping motor according to any one of claim 3, wherein the arc-shaped deformation prevention groove is provided along the circumference at the side end contacting the base to which the stepping motor is mounted.

12. A stepping according to any one of claim 2, wherein the rotor is provided opposing the stator magnetic poles on a rotor yoke secured to the rotating shaft and a notch is provided in the rotor yoke in order to leak magnetism of the rotor, further comprising a leakage flux detector for detecting leaking magnetic flux from the rotor, the leakage flux detector provided in a position opposing notch.

13. A stepping motor according to any one of claim 3, wherein the rotor is provided opposing the stator magnetic poles on a rotor yoke secured to the rotating shaft and a notch is provided in the rotor yoke in order to leak magnetism of the rotor, further comprising a flux detector for detecting leaking magnetic flux from the rotor, the leakage flux detector provided in a position opposing the notch.

14. A stepping motor according to any one of claim 4, wherein the rotor is provided opposing the stator magnetic poles on a rotor yoke secured to the rotating shaft and a notch is provided in the rotor yoke in order to leak magnetism of the rotor, further comprising a leakage flux detector for detecting leaking magnetic flux from the rotor, the leakage flux detector provided in position opposing the notch.

15. A stepping motor according to any one of claim 2, further comprising a leakage flux detector for detecting changes in magnetic poles, the leakage flux detector provided on a cylinder end surface of a cylindrical permanent magnet provided in a cylindrical shape opposing the stator magnetic poles on the rotor yoke secured to rotating shaft.

16. A stepping motor according to any one of claim 3, further comprising a leakage flux detector for detecting changes in magnetic poles, the leakage flux detector provided on a cylinder end surface of a cylinder permanent magnet provided in a cylindrical shape opposing the stator magnetic poles on the rotor yoke secured to the rotating shaft.

17. A stepping motor according to any one of claim 4, further comprising a leakage flux detector for detecting changes in magnetic poles, the leakage flux detector provided on a cylinder end surface of a cylindrical permanent magnet provided in a cylindrical shape opposing the stator magnetic poles on the rotor yoke secured to the rotating shaft.

18. A stepping motor according to any one of claim 5, further comprising a leakage flux detector for detecting changes in magnetic poles, the leakage flux detector provided on a cylinder end surface of a cylindrical permanent magnet provided in a cylindrical shape opposing the stator magnetic poles on the rotor yoke secured to the rotating shaft.

19. A stepping motor according to claim 6, further comprising a rotary polygon mirror secured to the rotating shaft which is rotatably provided through the cylindrical bearing holder vertically mounted on the base to which the stepping motor is mounted, which rotates along with the rotating shaft, the rotary polygon mirror provided on the outer periphery of the rotor yoke with each mirror surface corresponding to magnetic pole of the rotor of the stepping motor.

* * * * *

UNITED STATES PATENT AND TRADEMARK OFFICE
CERTIFICATE OF CORRECTION

PATENT NO. : 6,700,240 B2
DATED : March 2, 2004
INVENTOR(S) : Naotaka Akiwa

It is certified that error appears in the above-identified patent and that said Letters Patent is hereby corrected as shown below:

Column 13,
Line 11, replace claim 1 with the following:

1.    A stepping motor comprising:

a permanent magnet type rotor with a plurality of poles secured to a rotating shaft and a stator having stator magnetic poles with stator magnetic pole teeth in which excitation windings are wound on a plurality of magnetic poles in a star or delta connection, wherein the rotor is magnetized in different directions alternately circumferentially and a relationship between a predetermined number of the stator magnetic poles and a predetermined number of the rotor magnet poles is established in accordance to a following equation: $M = 4F/3$ where M is the number of poles of the rotor and F is the number of the stator magnetic poles, the rotor is cylindrical in shape with the stator disposed inside, disposed opposing the surfaces of the stator magnetic pole teeth through an air gap which is of a uniform dimension throughout the circumference between the surfaces of the stator magnetic pole teeth of the stator and the rotor, and wherein the relationship of the predetermined numbers of stator poles and rotor poles enables surface magnetic flux distribution thereof having a substantially sinusoidal wave form circumferentially.

Line 46, replace claim 4 with the following:

4.    A stepping motor according to any one of claim 1, wherein an arc-shaped deformation preventing groove is provided along the circumference at the side end of a bearing holder contacting the base to which the stepping motor is mounted.

Line 65, replace claim 7 with the following:

7.    A stepping motor according to claim 5, further comprising a rotary polygon mirror secured to the rotating shaft which is rotatably provided through the cylindrical bearing holder vertically mounted on the base to which the stepping motor is mounted, said polygon mirror rotates along with the rotating shaft and wherein the rotary polygon mirror is provided on the outer periphery of the rotor yoke with each mirror surface corresponding to a magnetic pole of the rotor of the stepping motor.

UNITED STATES PATENT AND TRADEMARK OFFICE
CERTIFICATE OF CORRECTION

PATENT NO. : 6,700,240 B2
DATED : March 2, 2004
INVENTOR(S) : Naotaka Akiwa

It is certified that error appears in the above-identified patent and that said Letters Patent is hereby corrected as shown below:

Column 14,
Line 7, replace claim 8 with the following:

8.    A stepping motor device comprising:

a stepping motor including a permanent magnet type rotor with a plurality of poles secured to a rotating shaft, a stator having stator magnetic poles with stator magnetic pole teeth in which excitation windings are wound on a plurality of magnetic poles in a star or delta connection, and a rotary polygon mirror provided on the outer periphery of a rotor yoke rotatable along with the rotating shaft with each mirror surface corresponding to a magnetic pole of the rotor, wherein the rotor is magnetized in different directions alternately circumferentially and a relationship between a predetermined number of the stator magnetic poles and a predetermined number of the rotor magnet poles is established in accordance to a following equation: $M = 4F / 3$ where M is the number of poles of the rotor and F is the number of the stator magnetic poles, the rotor is cylindrical in shape with the stator disposed inside, disposed opposing the surfaces of the stator magnetic pole teeth through an air gap which is of a uniform dimension throughout the circumference between the surfaces of the stator magnetic pole teeth of the stator and the rotor, and wherein said relationship of the predetermined numbers of stator poles and rotor poles enables surface magnetic flux distribution thereof having a substantially sinusoidal wave form circumferentially;

a leakage flux detector for detecting changes in magnetic poles provided on a cylindrical end surface of the rotor of the stepping motor;

a driving means to control rotation of the stepping motor by impressing a driving signal in a three-phase single-two-phase excitation mode to three excitation feeding terminals in a star or delta connection wound on a plurality of magnetic poles of the stepping motor; and a means to detect the position of the rotary polygon mirror by a signal from the leakage flux detector.

UNITED STATES PATENT AND TRADEMARK OFFICE
CERTIFICATE OF CORRECTION

PATENT NO.    : 6,700,240 B2
DATED         : March 2, 2004
INVENTOR(S)   : Naotaka Akiwa It is certified that error appears in the above-identified patent and that said Letters Patent is hereby corrected as shown below:

Column 14 (cont'd),
Line 44, replace claim 9 with the following:

9.    A stepping motor device comprising:

a stepping motor including a permanent magnet type rotor with a plurality of poles secured to a rotating shaft, and a stator having stator magnetic poles with stator magnetic pole teeth in which excitation windings are wound around a plurality of magnetic poles in a star or delta connection, wherein the rotor is magnetized in different directions alternately circumferentially and a relationship between a predetermined number of the stator magnetic poles and a predetermined number of the rotor magnet poles is established in accordance to a following equation: $M = 4F / 3$ where M is the number of poles of the rotor and F is the number of the stator magnetic poles, the rotor is cylindrical in shape with the stator disposed inside, disposed opposing the surfaces of the stator magnetic pole teeth through an air gap which is of a uniform dimension throughout the circumference between the surfaces of the stator magnetic pole teeth of the stator and the rotor, and wherein said relationship of the predetermined numbers of stator poles and rotor poles enables surface magnetic flux distribution thereof having a substantially sinusoidal wave form circumferentially;

a driving means to impress a driving signal in a three-phase single-two-phase excitation mode to three excitation feeding terminals and to control rotation of the stepping motor by a signal from a leakage flux detector for detecting magnetic flux leaking from a notch provided in a rotor yoke; and a means to repeat the processing to control the rotation a predetermined number of times and to issue a warning when normal rotation is not obtained.

Column 15,
Line 7, replace claim 10 with the following:

10.    A stepping motor according to any one of claim 2, wherein an arc-shaped deformation preventing groove is provided along the circumference at the side end of the bearing holder contacting the base to which the stepping motor is mounted.

UNITED STATES PATENT AND TRADEMARK OFFICE
CERTIFICATE OF CORRECTION

PATENT NO. : 6,700,240 B2
DATED : March 2, 2004
INVENTOR(S) : Naotaka Akiwa

It is certified that error appears in the above-identified patent and that said Letters Patent is hereby corrected as shown below:

Column 15 (cont'd),
Line 11, replace claim 11 with the following:

11. A stepping motor according to any one of claim 3, wherein the arc-shaped deformation preventing groove is provided along the circumference at the side end of the bearing holder contacting the base to which the stepping motor is mounted.

Column 16,
Line 7, replace claim 19 with the following:

19. A stepping motor according to claim 6, further comprising a rotary polygon mirror secured to the rotating shaft which is rotatably provided through the cylindrical bearing holder vertically mounted on the base to which the stepping motor is mounted, said polygon mirror rotates along with the rotating shaft and wherein the rotary polygon mirror is provided on the outer periphery of the rotor yoke with each mirror surface corresponding to a magnetic pole of the rotor of the stepping motor.

Signed and Sealed this

Sixth Day of December, 2005

JON W. DUDAS
*Director of the United States Patent and Trademark Office*